(12) United States Patent
Caldera et al.

(10) Patent No.: US 11,916,906 B2
(45) Date of Patent: Feb. 27, 2024

(54) IDENTITY MANAGEMENT USING REMOTE AUTHENTICATION

(71) Applicant: Acuant, Inc., Los Angeles, CA (US)

(72) Inventors: Jose Caldera, Palo Alto, CA (US); Kieran Gerard Sherlock, Palo Alto, CA (US)

(73) Assignee: Acuant, Inc., Los Angeles, CA (US)

( * ) Notice: Subject to any disclaimer, the term of this patent is extended or adjusted under 35 U.S.C. 154(b) by 400 days.

(21) Appl. No.: 17/196,851

(22) Filed: Mar. 9, 2021

(65) Prior Publication Data

US 2022/0294783 A1 Sep. 15, 2022

(51) Int. Cl.
*G06F 21/00* (2013.01)
*H04L 9/40* (2022.01)

(52) U.S. Cl.
CPC ...... *H04L 63/0884* (2013.01); *H04L 63/0861* (2013.01); *H04L 63/0876* (2013.01)

(58) Field of Classification Search
CPC ............. H04L 63/0884; H04L 63/0861; H04L 63/0876
See application file for complete search history.

(56) References Cited

U.S. PATENT DOCUMENTS

| | | | | |
|---|---|---|---|---|
| 10,346,845 B2* | 7/2019 | Sherlock | ............ | G06Q 20/4014 |
| 2005/0278542 A1* | 12/2005 | Pierson | ............... | H04L 63/0876 |
| | | | | 713/182 |
| 2008/0140576 A1* | 6/2008 | Lewis | .................... | G06Q 30/02 |
| | | | | 707/999.107 |
| 2009/0089869 A1* | 4/2009 | Varghese | ........... | G06Q 20/4014 |
| | | | | 726/7 |
| 2010/0138340 A1* | 6/2010 | Shirey | ................ | G06Q 20/4016 |
| | | | | 705/40 |
| 2018/0212960 A1* | 7/2018 | Sandeep | .................. | G09C 1/00 |
| 2018/0359245 A1* | 12/2018 | Zhang | ................... | H04L 9/3226 |
| 2021/0110399 A1* | 4/2021 | Kolkowitz | ............. | G06Q 50/01 |
| 2022/0131844 A1* | 4/2022 | Sherlock | ............. | H04L 63/1433 |

* cited by examiner

*Primary Examiner* — Kendall Dolly
(74) *Attorney, Agent, or Firm* — Greenberg Traurig (57) ABSTRACT

A system includes an identity authentication system interface operatively coupled to a computerized network for receiving identity information over the computerized network. An identity authentication tool operatively coupled to the identity authentication system interface that receives, from the identity authentication system interface, a request to authenticate an identity; information pertaining to the user; information pertaining to the user; a collected electronic signature representation of a user; and a private information indicator from the user device. The identity authentication tool determines an indication of whether the user information matches user information stored by the identity authentication tool; and the private information indicator from the user device indicates that the user's private information was verified. An indication that the identity was verified or not verified is output by the identity authentication tool.

23 Claims, 4 Drawing Sheets

IDENTITY MANAGEMENT USING REMOTE AUTHENTICATION

FIELD OF THE TECHNOLOGY

At least some embodiments disclosed herein relate generally to identity verification and authentication systems. More specifically, embodiments herein relate to systems and methods for assessing, identifying, or any combination thereof, an identity of an individual.

BACKGROUND

User authentication and identity security are a widespread demand. The ease of access to electronic devices increases the opportunities for remote identity verification. These electronic devices can be used as a proxy for an identity or material for authenticating an identity. These proxies for identity are not currently accurate enough and are highly susceptible to attacks.

Improved methods for identity management in which electronic devices are used as a proxy, but not a definitive authentication, for an identity or material for authenticating an identity are desirable.

SUMMARY

In some embodiments, systems and methods for assessing, identifying, or any combination thereof, an identity of an individual can Identity management and authentication can rely upon a combination of centralized information and private information.

In some embodiments, a system includes an identity authentication system interface operatively coupled to a computerized network for receiving identity information over the computerized network. An identity authentication tool is operatively coupled to the identity authentication system interface. The identity authentication tool is configured to receive, from the identity authentication system interface, a request to authenticate an identity. User information pertaining to the user, a collected electronic signature representation of a user, and a private information authentication indicator is received. The identity authentication tool determines an indication of whether the user information matches user information stored by the identity authentication tool; and the private authentication indicator indicates that the user's private authentication data was previously verified. The identity authentication tool transmits one of an indication that the authentication of the user identity failed in response to the identity authentication tool determining that at least one of the user information does not match the user information stored by the identity authentication tool or that the private information was not verified; or an indication that the authentication of the user identity was verified in response to the identity authentication tool determining that both of the user information matches the user information stored by the identity authentication tool and that the private information was verified.

In some embodiments, a system includes an identity authentication system interface operatively coupled to a computerized network for receiving identity verification information over the computerized network; and an identity authentication tool operatively coupled to the identity authentication system interface. The identity authentication tool is configured to receive, from the identity authentication system interface, a request to authenticate an identity; and to receive, from the identity authentication system interface, information pertaining to the user; a collected electronic signature representation of a user; and a private information indicator from the user device. The identity authentication tool determines the private information indicator from the user device indicates that the user's private information was verified; and transmits, by the identity authentication tool an indication that the identity was not verified in response to the identity authentication tool determining that the private information was not verified. The identity authentication tool transmits an indication of whether the user matches user information stored by the identity authentication tool in response to determining the user's private information was verified. The identity authentication tool transmits one of an indication that the user's identity was not verified in response to the identity authentication tool determining that the user information does not match the user information stored by the identity authentication tool; or an indication that the user's identity was verified in response to the identity authentication tool determining that the user information matches the user information stored by the identity authentication tool.

In some embodiments, the user information includes computer fingerprint attributes of a user computer system, the computer fingerprint attributes including a plurality of attributes taken from the group consisting of processor characteristics of the user computer system; machine memory size of the user computer system; a value loaded at a predetermined location in the user computer system; a value loaded into a registry in an operating system of the user computer system; an Ethernet MAC address of the user computer system; network information of the user computer system; identification of a program loaded onto the user computer system; and a log file in the user computer system.

In some embodiments, the private information includes biometrics data including at least one taken from the group consisting of a fingerprint, a facial recognition, and a voice recognition.

In some embodiments, in response to determining the private information was verified, the user information is verified.

In some embodiments, in response to determining the private information was not verified, the user information is not verified.

In some embodiments, the private information is not stored by the identity authentication tool.

In some embodiments, the private information is not received by the identity authentication tool.

In some embodiments, a time limit is set for receiving the private information indicator after receiving the request to authenticate an identity.

In some embodiments, in response to not receiving the private information indicator within the time limit, the identity authentication tool transmits an indication that the authentication is suspicious.

In some embodiments, the identity authentication tool includes a private information type indicator.

In some embodiments, the private information indicator includes the private information type indicator.

In some embodiments, the identity authentication tool determines whether the private information type indicator matches a private information type indicator stored in the identity authentication system, and in response to the private information type indicator not matching, the identity authentication tool transmits an indication that the verification is suspicious.

In some embodiments, the indication that the authentication of the user identity failed and the indication that the authentication of the user identity was verified is included as a trust score representing a likelihood that the user identity was accurately verified.

BRIEF DESCRIPTION OF THE DRAWINGS

References are made to the accompanying drawings that form a part of this disclosure and illustrate embodiments in which the systems and methods described herein can be practiced.

Like reference numbers represent the same or similar parts throughout.

DETAILED DESCRIPTION

Identity management and authentication can rely upon a combination of centralized information and private information. Some embodiments of this disclosure utilize a combination of private information, which is not accessible by a centralized authentication system and is separate from the centralized authentication system, and centralized information, which is stored on the centralized authentication system (or otherwise accessible to the centralized authentication system), to complete an authentication or force a reauthentication in the case of a failed authentication.

In some embodiments, a method can include verifying private information during an identity verification. The authentication system enables verification of the private information using the user device. The user device sends an indication of whether the private information was verified, without sending any of the private data to the authentication system. The verification can include a trust score instead of a binary verified or not verified result when providing the indication to the authentication system. Depending upon the trust score, the authentication system can determine whether or not to accept the verification of the private information. Collectively, the authentication system utilizes the indication of whether the private information was verified and authentication in the centralized system to make an identity authentication determination.

"Private information," as used herein, can include information that, if compromised, would jeopardize the integrity of the entity that defines such information as private. Examples of private information include, but are not limited to, information defining what a user is (e.g., biometrics data or the like), information a user has (e.g., an identification document such as a passport, driver's license, or the like; a physical token including a private key or the like), or information a user has (e.g., device keys for the user device or the like).

In some embodiments, biometrics data can include a fingerprint. For example, in some embodiments, a fingerprint can be used to authenticate a user of a device such as a mobile device. In some embodiments, biometrics data can include facial recognition. For example, in some embodiments, an image of a user's face can be used to authenticate a user of a device such as a mobile device. In some embodiments, biometrics data can include an audio recording of a user's voice. For example, in some embodiments, a user may say a word, phrase, or sentence to authenticate the user of a device such as a mobile device. In some embodiments, biometrics data can include other data unique to a trait of the user, such as, but not limited to, a heart rhythm or the like. It is to be appreciated that biometrics data can include the above examples separately or in any combination thereof. In some embodiments, the biometrics data can be encrypted along with a unique hardware device identifier.

Figure 1:
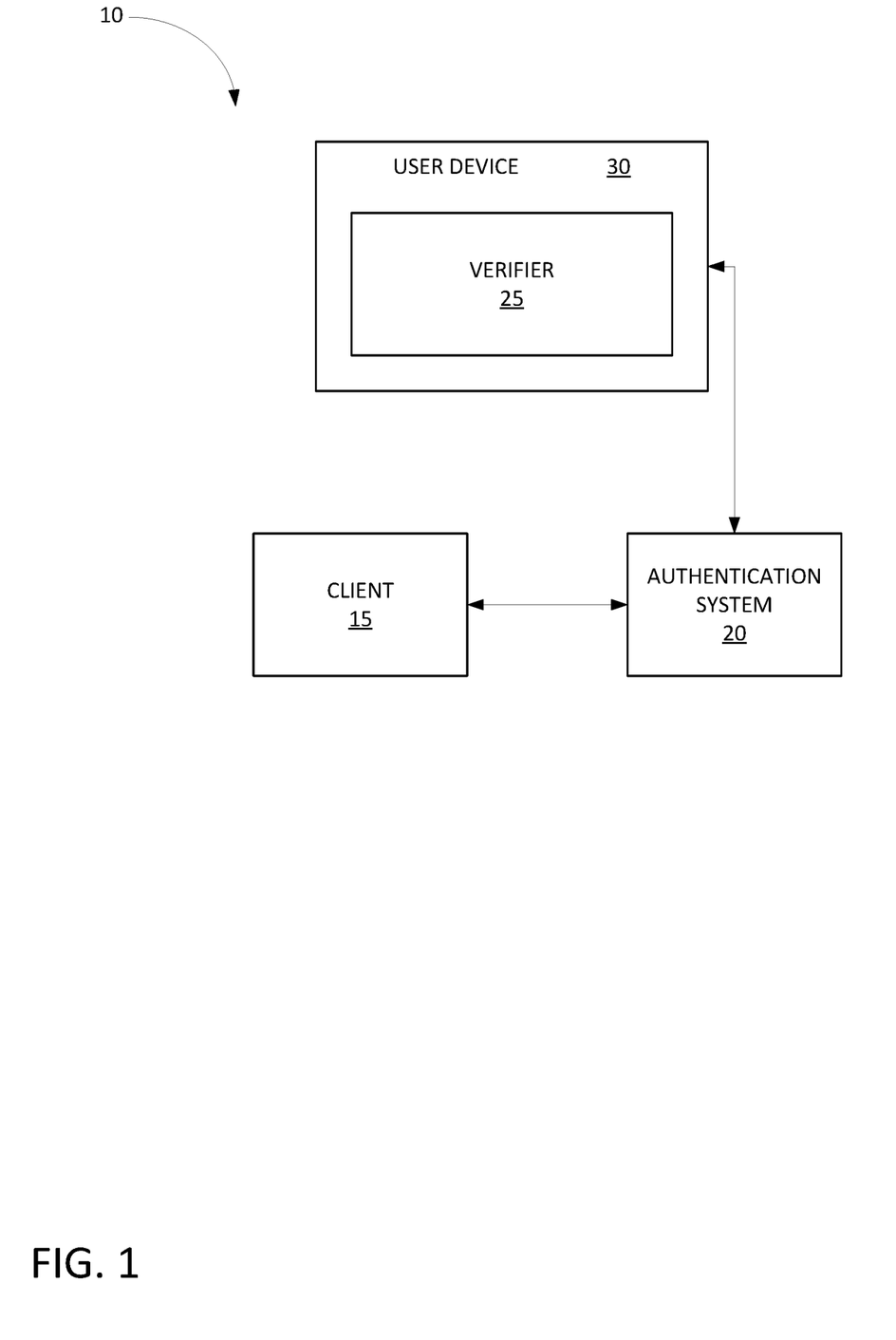
FIG. 1 is a block diagram illustrating an identity assessment and authentication environment, according to some embodiments.

FIG. 1 is a block diagram illustrating an identity assessment and authentication environment 10, according to some embodiments. The identity assessment and authentication environment 10 can include a client 15 (e.g., a bank or financial institution, a retailer, a health care provider, or the like) that submits information pertaining to an identity verification to an identity authentication system 20. The identity authentication system 20 can be used to verify a user identity and provide a result of the verification to the client 15. The identity authentication system 20 may leverage a verifier 25 which, in the illustrated embodiment, is present on a user device 30 when identifying a user. In some embodiments, the verifier 25 can be physically separate from the user device 30, but in electronic communication with the user device 30 (e.g., via a network or the like). In some embodiments, the verifier 25 can include a biometrics verifier.

The identity authentication system 20 may output an indication of whether the user was verified or not. In some embodiments, the indication of whether the user was verified can be a binary value (e.g., verified or not verified). In some embodiments, the indication of whether the user was verified can include a trust score that indicates a level of confidence of the verification of the user's private information via the user device 30. The trust score can be in addition to, or in place of, the indication of whether the user's private information was verified.

As a result, the client 15 can then determine whether to accept the results of the identity verification or require additional identity verification. Thus, the identity assessment and authentication environment 10 can utilize a combination of user information stored by the identity authentication system 20 and a private information verification leveraging the verifier 25. Accordingly, the identity authentication system 20 does not store any private information, which is instead maintained on the user device 30 or otherwise controlled by the user (e.g., the private information may not be stored on the user device 30). This can, for example, improve a security of the identity assessment and authentication environment 10, as the user does not send private information to a remote device (e.g., the identity authentication system 20), but instead permits the user to maintain the private information and the verifier 25 on the user device 30 or accessible to the user device 30. In some embodiments, this can additionally reduce privacy concerns for the user, as the user maintains his or her private information.

User information may include a user's name, address, and related information, computer and IP location information, or any combination thereof. The user information can include past identity verifications, past transactions, and past payments information that can include account numbers and details and/or payment history information. The user information can include authentication information that may include information associated with online accounts and/or out of band authentication (e.g., authentication of the user via communications channels other than the primary communications channel being used to conduct the transaction, such as authentication using a telephone for a transaction conducted via the internet). The user information can include web experience information such as social networks friends and/or website-related data, such as cookies and/or visited URLs (uniform resource locators) associated with the user's web experience.

Some exemplary embodiments may be configured to utilize electronic signatures to identify users, or as a common component in the identification of users. In some exemplary embodiments, this may reduce or eliminate dependence upon user-supplied information to identify users. In some exemplary embodiments, the actual underlying data in an electronic signature may be less important than correlation between aspects of a newly collected electronic signature and a previously collected electronic signature.

Some exemplary embodiments may reduce the likelihood that a user's identity may be hidden. For example, some exemplary embodiments may assess the degree of correlation of a newly collected electronic signature with a previously collected electronic signature. The degree of correlation may be evaluated to determine whether such electronic signatures uniquely identify the user. If so, the electronic signature may be considered to be positive identification of the user in the transaction.

Some exemplary embodiments may use any technology to help identify a user at their computer or site using identifying attributes and/or data. Instead of (or in addition to) using technologies to generate "blacklists" (or negative lists of users with bad payment credentials), some exemplary embodiment may use attributes to help identify the user in different contexts. The present disclosure contemplates that the attributes may not necessarily identify the user completely. Cryptographic techniques may be used to store encrypted information that may be transmitted by the user. The encrypted information may assist a merchant in determining the identification of a consumer (user) using a payment instrument.

Figure 2:
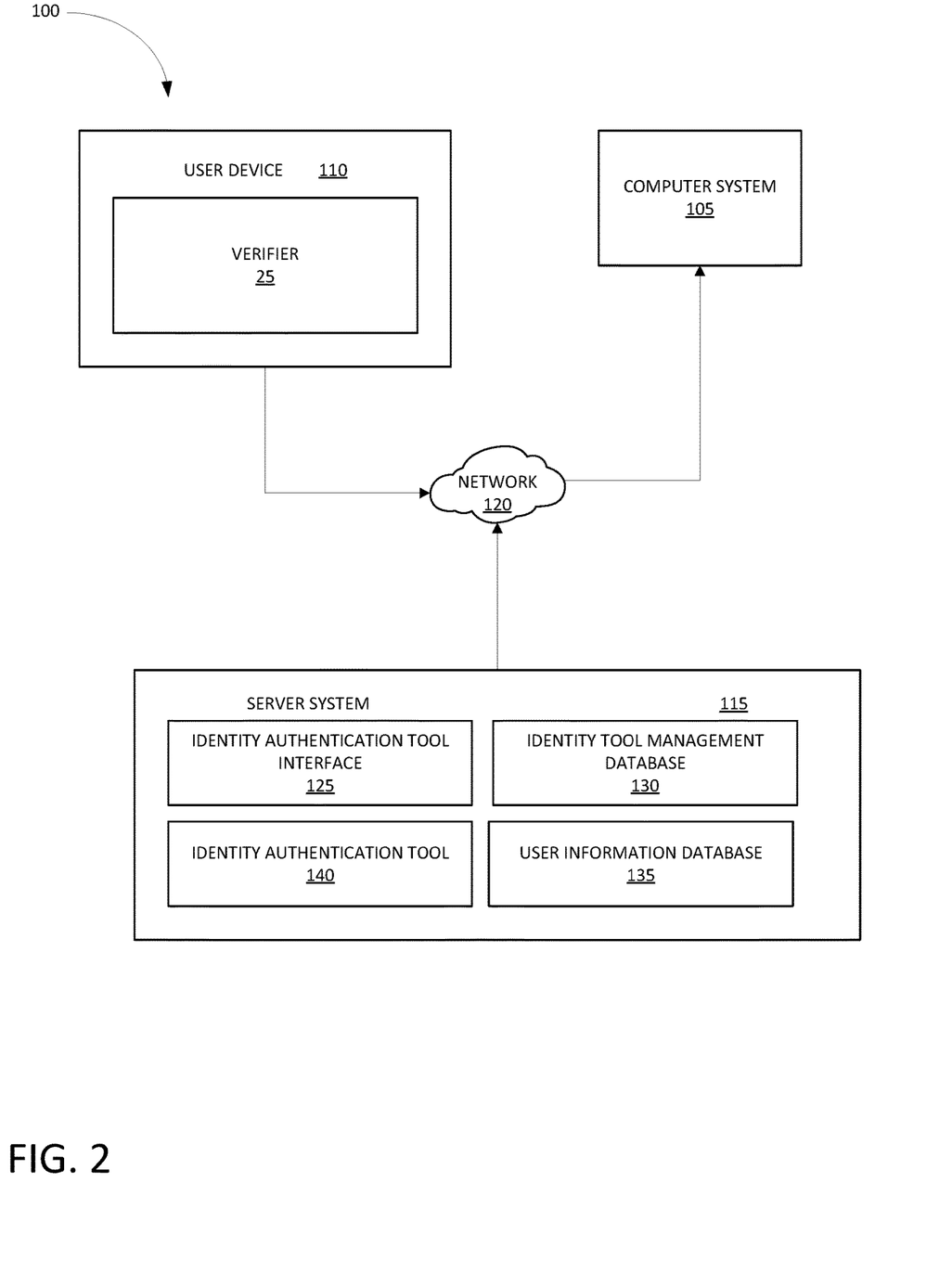
FIG. 2 is a block diagram illustrating a system for assessing and authenticating an identity, according to some embodiments.

FIG. 2 is a block diagram illustrating a system 100 for assessing and authenticating an identity, according to some embodiments.

The system 100 includes one or more computer systems 105, one or more user computer systems 110, and one or more server systems 115. The one or more computer systems 105, one or more user computer systems 110, and one or more server systems 115 are operatively connected via one or more computerized networks 120. The one or more computerized networks 120 can include, for example, the Internet, one or more intranets, or any combination thereof. The one or more server systems 115 can include an identity authentication tool interface 125. The identity authentication tool interface 125 can be operatively connected to one or more identity authentication tool management databases 130, one or more user information databases 135 (which can include user data, authentication data, transaction data, or any combination thereof), and identity authentication tool software (e.g., which may be provided on one or more computer readable media), or any combination thereof.

In some embodiments, the one or more computer systems 105, the one or more user computer systems 110, the one or more server systems 115, or any combination thereof, may be in communication with each other directly or via network connections (e.g., the one or more computerized networks 120 such as the Internet, intranet, other network, or any combination thereof). User information may be transmitted to a user information database for storage.

In some embodiments, the system 100 can include a time limit such that the user has a limited amount of time to complete private information verification after a request from the identity authentication tool 140. In some embodiments, if the time limit passes, the identity authentication tool 140 may consider the private information verification to have failed. In some embodiments, if the time limit passes, the identity authentication tool 140 can lower a trust score associated with the identity verification, but still consider the private information verification to have been successful.

In some embodiments, the system 100 may use unique private information of a user and user information (including, but not limited to, prior purchasing behavior, or the like) associated with the user to determine whether a person being authenticated is truly the authorized user. In some embodiments, the one or more computer systems 105 can receive a request from a user to initiate a transaction, access a server, or other similar action that would require a verification of the user's identity. The one or more computer systems 105 can request an authentication of the user's identity from the one or more server systems 115, which can in turn request that the user reauthenticate private information via one or more user computer systems 110. The one or more server systems 115 can receive a result of the private information verification from the one or more user computer systems 110 and, in conjunction with user information of the user, output an indicator to the one or more computer systems 105 regarding whether to the user's identity has been verified. In some embodiments, the indicator to the one or more computer systems 105 can be a binary indicator (e.g., verified or not verified). In some embodiments, the indicator can be a binary indicator in conjunction with a trust score indicating how likely the private information verification was acceptable. In some embodiments, the indicator can include a trust score and the one or more computer systems 105 can determine whether to accept the verification.

In the system 100, the one or more server systems 115 can include user information in a hashed form so that the user information is not directly stored by the one or more server systems 115. Additionally, the one or more server systems 115 can authenticate the user's identity based on a combination of the user information and the private information without storing any private information of users on the one or more server systems 115. As such, the system 100 includes a combination of localized authentication and distributed authentication to provide an authentication decision to the one or more computer systems 105. In some embodiments, the combination of localized authentication and distributed authentication can enhance the strength of the identity verification without sharing private information.

In some embodiments, the one or more computer systems 105 can be, for example, a computer system of a merchant (e.g., selling goods), a bank or other financial institution, health care provider, or other party requiring a user's identity to be confirmed to reduce likelihood of and prevent fraudulent transactions.

To provide additional context for various aspects of the present disclosure, the following discussion is intended to provide a brief, general description of a suitable computing environment in which the various aspects may be implemented. While some exemplary embodiments relate to the general context of computer-executable instructions that may run on one or more computers, those skilled in the art will recognize that the embodiments also may be implemented in combination with other program modules and/or as a combination of hardware and software.

Generally, program modules include routines, programs, components, data structures, etc., that perform particular tasks or implement particular abstract data types. Moreover, those skilled in the art will appreciate that aspects of the disclosure may be practiced with other computer system configurations, including single-processor or multiprocessor computer systems, minicomputers, mainframe computers, as well as personal computers, hand-held wireless computing devices, microprocessor-based or programmable consumer electronics, and the like, each of which can be operatively coupled to one or more associated devices. Aspects of the disclosure may also be practiced in distributed computing environments where certain tasks are performed by remote processing devices that are linked through a communications network. In a distributed computing environment, program modules may be located in both local and remote memory storage devices.

A computer may include a variety of computer readable media. Computer readable media may be any available media that can be accessed by the computer and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which may be used to store the desired information and which may be accessed by the computer.

An exemplary environment for implementing various aspects may include a computer that includes a processing unit, a system memory and a system bus. The system bus couples system components including, but not limited to, the system memory to the processing unit. The processing unit may be any of various commercially available processors. Dual microprocessors and other multi-processor architectures may also be employed as the processing unit.

The system bus may be any of several types of bus structure that may further interconnect to a memory bus (with or without a memory controller), a peripheral bus, and a local bus using any of a variety of commercially available bus architectures. The system memory may include read only memory (ROM) and/or random access memory (RAM). A basic input/output system (BIOS) is stored in a non-volatile memory such as ROM, EPROM, EEPROM, which BIOS contains the basic routines that help to transfer information between elements within the computer, such as during start-up. The RAM may also include a high-speed RAM such as static RAM for caching data.

The computer may further include an internal hard disk drive (HDD) (e.g., EIDE, SATA), which internal hard disk drive may also be configured for external use in a suitable chassis, a magnetic floppy disk drive (FDD), (e.g., to read from or write to a removable diskette) and an optical disk drive, (e.g., reading a CD-ROM disk or, to read from or write to other high capacity optical media such as the DVD). The hard disk drive, magnetic disk drive and optical disk drive may be connected to the system bus by a hard disk drive interface, a magnetic disk drive interface and an optical drive interface, respectively. The interface for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods herein.

A number of program modules may be stored in the drives and RAM, including an operating system, one or more application programs, other program modules and program data. All or portions of the operating system, applications, modules, and/or data may also be cached in the RAM. It is appreciated that the embodiments may be implemented with various commercially available operating systems or combinations of operating systems.

It is also within the scope of the disclosure that a user may enter commands and information into the computer through one or more wired/wireless input devices, for example, a touch-screen, a keyboard and a pointing device, such as a mouse. Other input devices may include a microphone (functioning in association with appropriate language processing/recognition software as known to those of ordinary skill in the technology), an IR remote control, a joystick, a game pad, a stylus pen, or the like. These and other input devices are often connected to the processing unit through an input device interface that is coupled to the system bus, but may be connected by other interfaces, such as a parallel port, an IEEE 1394 serial port, a game port, a USB port, an IR interface, etc.

A display monitor or other type of display device may also be connected to the system bus via an interface, such as a video adapter. In addition to the monitor, a computer may include other peripheral output devices, such as speakers, printers, etc.

The computer may operate in a networked environment using logical connections via wired and/or wireless communications to one or more remote computers. The remote computer(s) may be a workstation, a server computer, a router, a personal computer, a portable computer, a personal digital assistant, a cellular device, a microprocessor-based entertainment appliance, a peer device or other common network node, and may include many or all of the elements described relative to the computer. The logical connections depicted include wired/wireless connectivity to a local area network (LAN) and/or larger networks, for example, a wide area network (WAN). Such LAN and WAN networking environments are commonplace in offices, and companies, and facilitate enterprise-wide computerized networks, such as intranets, all of which may connect to a global communications network such as the Internet.

The computer may be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi (such as IEEE 802.11x (a, b, g, n, etc.)) and Bluetooth™ wireless technologies. Thus, the communication may be a predefined structure as with a conventional network or simply an ad hoc communication between at least two devices.

The system may also include one or more server(s). The server(s) may also be hardware and/or software (e.g., threads, processes, computing devices). The servers may house threads to perform transformations by employing aspects of the disclosure, for example. One possible communication between a client and a server may be in the form of a data packet adapted to be transmitted between two or more computer processes. The data packet may include a cookie and/or associated contextual information, for example. The system may include a communication framework (e.g., a global communication network such as the Internet) that may be employed to facilitate communications between the client(s) and the server(s).

Some exemplary embodiments may accumulate results from transactions over time, such as charge backs and refunds. This information may help in assessing the fraud score of a transaction requested by the user. For example, a lower fraud score would result from knowledge that this user does regular charge backs, then merchants can apply their anti-fraud policy to determine whether the transaction would be accepted.

Some exemplary embodiments may be configured to associate a credit card or another payment instrument with more than one user, as in a family situation. Building a graph connecting multiple users to the devices, locations, and payment instruments may also affect the fraud score of a transaction. A graph may associate different entities through having common key attributes that may uniquely identify a user. For example, if two users share the same browser or PC fingerprint, then the graph may identify those two users as associated by sharing the browser or fingerprint. The same may apply for IP address, credit card number or billing address, for example.

In some exemplary embodiments, use of a payment instrument through a known trusted source (e.g., certain well-known and trusted online retailers) may establish a base reputation for a user with an electronic signature for a merchant or collection of merchants not affiliated with the trusted source. For example, recognizing the user's use of the trusted source for a transaction may provide an increased level of confidence that the user is known to accurately to the service.

Figure 3:
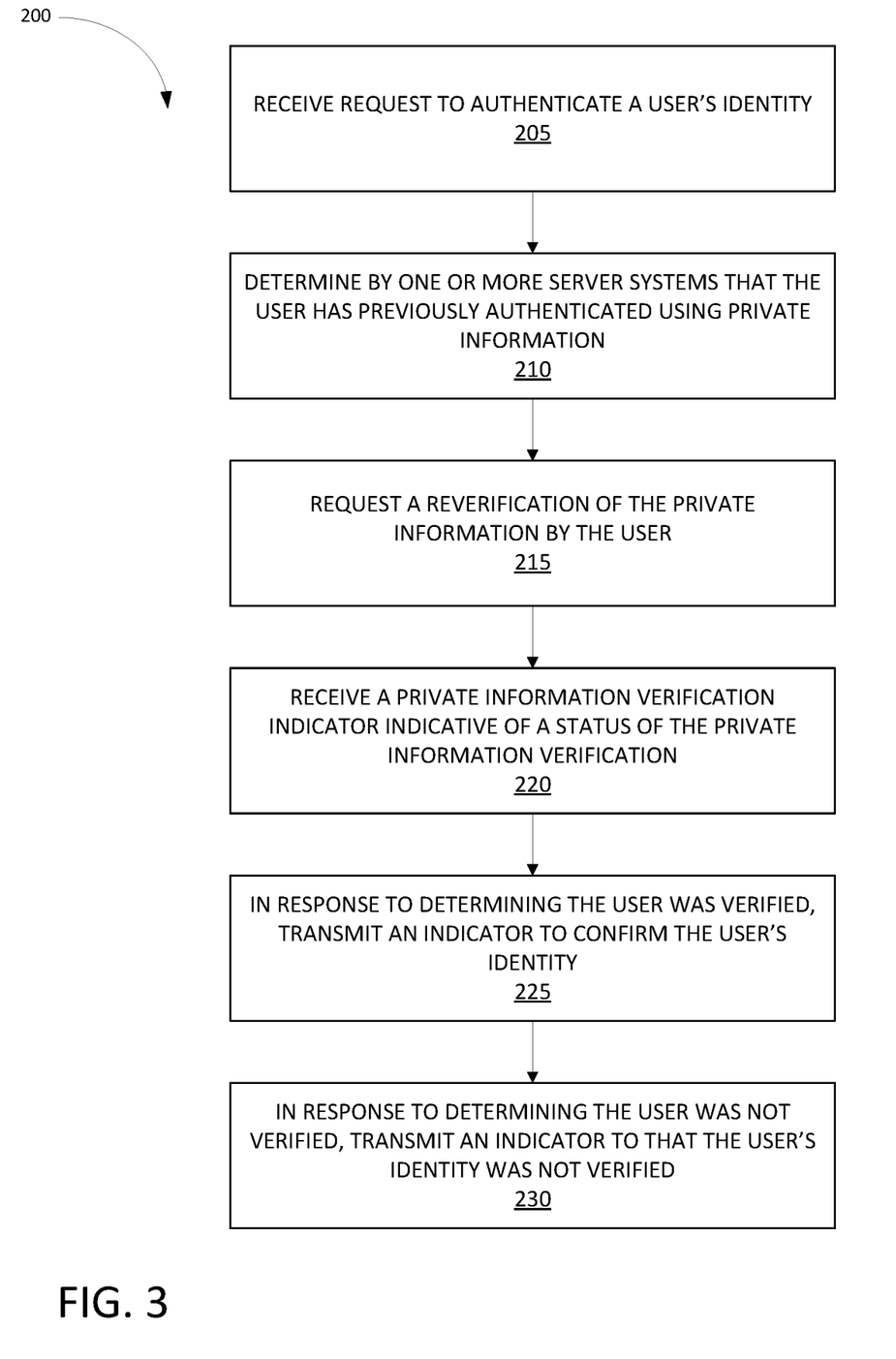
FIG. 3 is a flowchart illustrating an identity assessment and authentication method, according to some embodiments.

FIG. 3 is a flowchart illustrating a method 200 for transaction assessment and authentication, according to some embodiments. The method 200 can be performed using the identity assessment and authentication environment 10 (FIG. 1) and the system 100 (FIG. 2).

At block 205, the method 200 includes receiving, by one or more server systems 115 of an identity authentication system 20, a request to authenticate a user in a proposed transaction. The request can be received from one or more computer systems 105 of a client 15.

At block 210, the method 200 includes determining, by the one or more server systems 115 of the identity authentication system 20, that the user in the transaction has previously been authenticated using biometrics data. For example, the personal information maintained for the user can include a flag indicative of whether the user has previously utilized biometrics data for verification purposes. If the user has not utilized biometrics data, the flag in the identity authentication system 20 will indicate that the user has not been authenticated using biometrics data and accordingly, the user and the transaction will be authenticated using the personal information without any biometrics data.

At block 215, in response to determining that the user has been previously authenticated using biometrics data, the identity authentication system 20 requests a reverification of the biometrics data by the user. As such, the identity authentication system 20 sends a request to the one or more user computer systems 110 of the user. The user can then validate the biometrics data using the verifier 25. The user device 30 transmits a result from the verifier 25 to the identity authentication system 20.

At block 220, the authentication system receives a result of the reverification from the user device based on the biometrics data. In the case of a failed validation, the user device 30 sends a verification failed indicator to the identity authentication system 20. The identity authentication system 20 then transmits a reject indicator to the client 15 so that the client 15 rejects the transaction as being potentially fraudulent. In some embodiments, in the case that the transaction is rejected, the client 15 can also alert the user of a potential fraudulent transaction. Conversely, in the case of a successful validation, the user device 30 sends a verification successful indicator to the identity authentication system 20.

At block 225, the authentication system determines the user was verified and transmits an indicator to authorize the transaction. At block 225, in response to receiving a verification successful indicator, the identity authentication system 20 additionally confirms that the personal information associated with the user results in an authentication validation.

At block 230, the authentication system determines the user was not verified and transmits an indicator to reject the transaction. At block 230, in response to receiving a verification failed indicator, the identity authentication system 20 transmits a reject indicator to the client 15. That is, when the biometrics verification fails, the identity authentication system 20 rejects the transaction regardless of the personal information verification related to the transaction.

Figure 4:
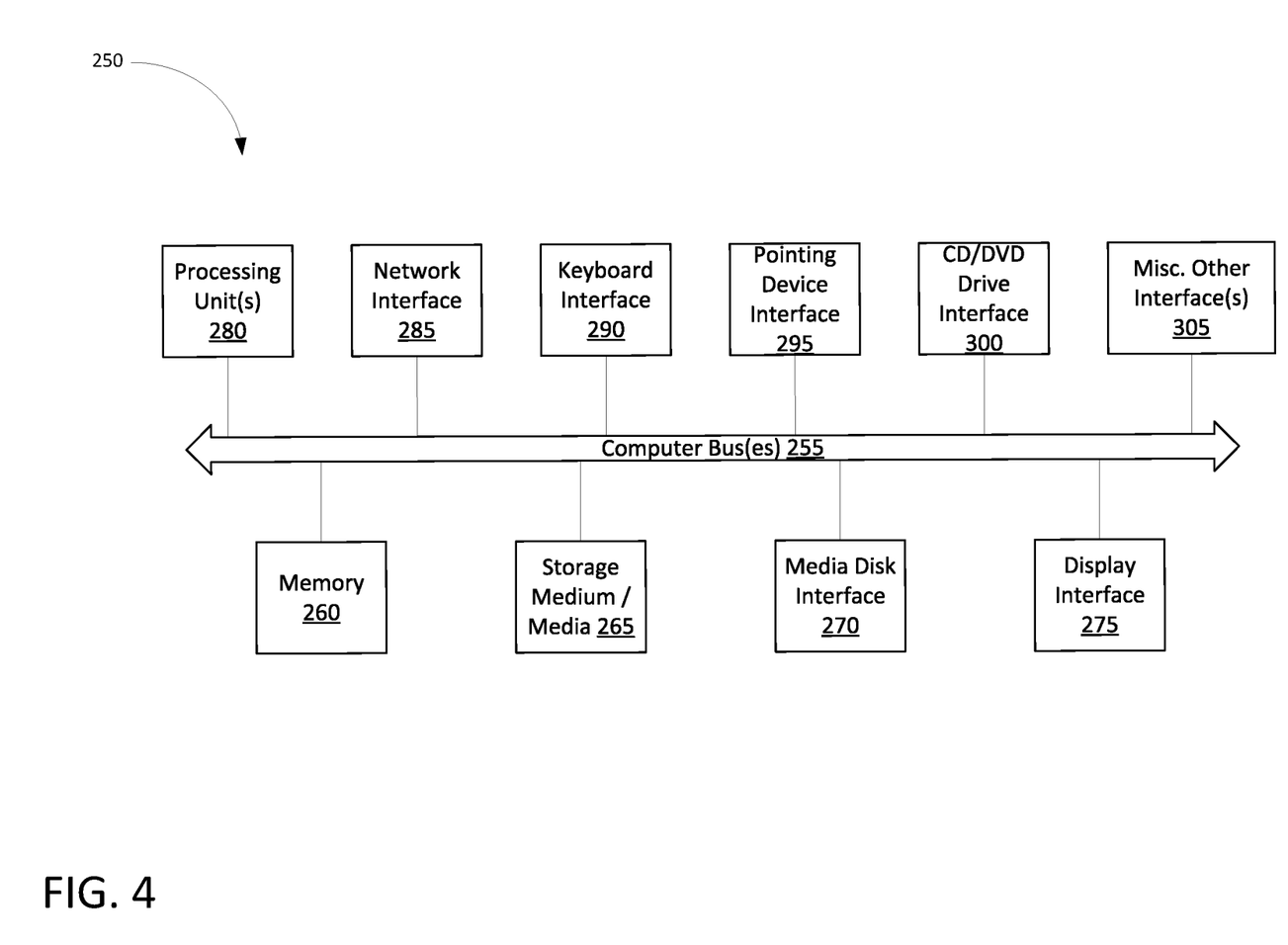
FIG. 4 is a block diagram illustrating an internal architecture of an example of a computer, according to some embodiments.

FIG. 4 is a block diagram illustrating an internal architecture of an example of a computer, such as user device 30, client 15, computer system 105, user device 110, and/or server system 115 in accordance with some embodiments. A computer as referred to herein refers to any device with a processor capable of executing logic or coded instructions, and could be a server, personal computer, set top box, smart phone, pad computer or media device, to name a few such devices. As shown in the example of FIG. 4, internal architecture 250 includes one or more processing units (also referred to herein as CPUs) 280, which interface with at least one computer bus 255. Also interfacing with computer bus 255 are persistent storage medium/media 265, network interface 285, memory 260, e.g., random access memory (RAM), run-time transient memory, read only memory (ROM), etc., media disk drive interface 270 as an interface for a drive that can read and/or write to media including removable media such as floppy, CD ROM, DVD, etc. media, display interface 275 as interface for a monitor or other display device, keyboard interface 290 as interface for a keyboard, pointing device interface 295 as an interface for a mouse or other pointing device, and miscellaneous other interfaces not shown individually, such as parallel and serial port interfaces, a universal serial bus (USB) interface, and the like.

Memory 260 interfaces with computer bus 255 so as to provide information stored in memory 260 to CPU 280 during execution of software programs such as an operating system, application programs, device drivers, and software modules that comprise program code, and/or computer executable process operations, incorporating functionality described herein, e.g., one or more of process flows described herein. CPU 280 first loads computer executable process operations from storage, e.g., memory 260, storage medium/media 265, removable media drive, and/or other storage device. CPU 280 can then execute the stored process operations in order to execute the loaded computer-executable process operations. Stored data, e.g., data stored by a storage device, can be accessed by CPU 280 during the execution of computer-executable process operations.

Persistent storage medium/media 265 is a computer readable storage medium(s) that can be used to store software and data, e.g., an operating system and one or more application programs. Persistent storage medium/media 265 can also be used to store device drivers, such as one or more of a digital camera driver, monitor driver, printer driver, scanner driver, or other device drivers, web pages, content files, playlists and other files. Persistent storage medium/media 265 can further include program modules and data files used to implement one or more embodiments of the present disclosure.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Examples of computer-readable storage media include, but are not limited to, any tangible medium capable of storing a computer program for use by a programmable processing device to perform functions described herein by operating on input data and generating an output. A computer program is a set of instructions that can be used, directly or indirectly, in a computer system to perform a certain function or determine a certain result. Examples of computer-readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing.

In some embodiments, hardwired circuitry may be used in combination with software instructions. Thus, the description is not limited to any specific combination of hardware circuitry and software instructions, nor to any source for the instructions executed by the data processing system.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A system, comprising:
   a server system comprising a processor and a memory, the memory comprising:
      an identity authentication system interface operatively coupled to a computerized network for receiving identity information over the computerized network;
      an identity authentication tool operatively coupled to the identity authentication system interface, configured to:
         receive, from the identity authentication system interface, a request to authenticate an identity;
         receive, from the identity authentication system interface,
            user information pertaining to the user;
            a collected electronic signature representation of a user; and
            a private information authentication indicator;
         determine, by the identity authentication tool,
            an indication of whether the user information matches user information stored by the identity authentication tool; and
            the private information authentication indicator indicates that a user's-private information was previously verified;
         transmit, by the authentication tool, one of:
            an indication that the authentication of the user identity failed in response to the identity authentication tool determining that at least one of the user information does not match the user information stored by the identity authentication tool or that the user's private information was not verified; or
            an indication that the authentication of the user identity was verified in response to the identity authentication tool determining that both of the user information matches the user information stored by the identity authentication tool and that the user's private information was verified.

2. The system of claim 1, wherein the user information includes computer fingerprint attributes of a user computer system, the computer fingerprint attributes including a plurality of attributes taken from the group consisting of:
   processor characteristics of the user computer system;
   machine memory size of the user computer system;
   a value loaded at a predetermined location in the user computer system;
   a value loaded into a registry in an operating system of the user computer system;
   an Ethernet MAC address of the user computer system;
   network information of the user computer system;
   identification of a program loaded onto the user computer system; and
   a log file in the user computer system.

3. The system of claim 1, wherein the user's private information includes biometrics data including at least one taken from the group consisting of:
   a fingerprint, a facial recognition, and a voice recognition.

4. The system of claim 1, wherein in response to determining the user's private information was verified, the user information is verified.

5. The system of claim 1, wherein in response to determining the user's private information was not verified, the user information is not verified.

6. The system of claim 1, wherein the user's private information is not stored by the identity authentication tool.

7. The system of claim 1, wherein the user's private information is not received by the identity authentication tool.

8. The system of claim 1, further comprising a time limit for receiving the private information indicator after receiving the request to authenticate an identity.

9. The system of claim 8, wherein in response to not receiving the private information indicator within the time limit, the identity authentication tool transmits an indication that the authentication is suspicious.

10. The system of claim 1, wherein the identity authentication tool includes a private information type indicator.

11. The system of claim 10, wherein the private information indicator includes the private information type indicator.

12. The system of claim 11, wherein the identity authentication tool determines whether the private information type indicator matches a private information type indicator stored in the identity authentication system, and in response to the private information type indicator not matching, the identity authentication tool transmits an indication that the user's private information verification is suspicious.

13. The system of claim 1, wherein the indication that the authentication of the user identity failed and the indication that the authentication of the user identity was verified is included as a trust score representing a likelihood that the user identity was accurately verified.

14. A system, comprising:
one or more server systems comprising a processor and a memory, wherein the memory of the one or more server systems comprises:
an identity authentication system interface operatively coupled to a computerized network for receiving identity verification information over the computerized network;
an identity authentication tool operatively coupled to the identity authentication system interface, configured to:
receive, from the identity authentication system interface, a request to authenticate an identity;
receive, from the identity authentication system interface,
private information pertaining to a user;
a collected electronic signature representation of a user; and
a private information indicator;
determine, by the identity authentication tool,
the private information indicator from the user device indicates that a user's private information was verified;
transmit, by the identity authentication tool:
an indication that the identity was not verified in response to the identity authentication tool determining that the user's private information was not verified;
determine, by the identity authentication tool,
an indication of whether the user matches user information stored by the identity authentication tool in response to determining the user's private information was verified; and
transmit, by the identity authentication tool, one of:
an indication that the user's identity was not verified in response to the identity authentication tool determining that the user information does not match the user information stored by the identity authentication tool; or
an indication that the user's identity was verified in response to the identity authentication tool determining that the user information matches the user information stored by the identity authentication tool.

15. The system of claim 14, wherein the user's private information includes biometrics data that includes at least one taken from the group consisting of:
a fingerprint, a facial recognition, and a voice recognition.

16. The system of claim 14, wherein in response to determining the user's private information was verified, the user information is verified.

17. The system of claim 14, wherein in response to determining the user's private information was not verified, the user information is not verified.

18. The system of claim 14, wherein the user's private information is not stored by the identity authentication tool.

19. The system of claim 14, wherein the user's private information is not received by the identity authentication tool.

20. The system of claim 14, further comprising a time limit for receiving the private information indicator after receiving the request to authenticate an identity.

21. The system of claim 20, wherein in response to not receiving the private information indicator within the time limit, the identity authentication tool transmits an indication that the verification failed.

22. The system of claim 14, wherein the identity authentication tool includes a private information type indicator.

23. The system of claim 22, wherein the private information indicator includes the private information type indicator.

* * * * *